United States Patent
Gill (10) Patent No.: US 11,576,234 B2
(45) Date of Patent: Feb. 7, 2023

(54) INDUCTION HEATING ASSEMBLY FOR A VAPOUR GENERATING DEVICE

(71) Applicant: JT International S.A., Geneva (CH)

(72) Inventor: Mark Gill, London (GB)

(73) Assignee: JT International SA

( * ) Notice: Subject to any disclaimer, the term of this patent is extended or adjusted under 35 U.S.C. 154(b) by 266 days.

(21) Appl. No.: 16/638,643

(22) PCT Filed: Sep. 3, 2018

(86) PCT No.: PCT/EP2018/073617
§ 371 (c)(1),
(2) Date: Feb. 12, 2020

(87) PCT Pub. No.: WO2019/048380
PCT Pub. Date: Mar. 14, 2019

(65) Prior Publication Data
US 2021/0076742 A1  Mar. 18, 2021

(30) Foreign Application Priority Data
Sep. 6, 2017 (EP) .................. 17189678

(51) Int. Cl.
| | | |
|---|---|---|
| A24F 13/00 | (2006.01) | |
| H05B 6/10 | (2006.01) | |
| A24F 40/465 | (2020.01) | |
| A24F 40/65 | (2020.01) | |
| H02J 50/10 | (2016.01) | |
| A24F 40/90 | (2020.01) | |
| H02J 50/00 | (2016.01) | |
| A24F 40/20 | (2020.01) | |

(52) U.S. Cl.
CPC .......... *H05B 6/108* (2013.01); *A24F 40/465* (2020.01); *A24F 40/65* (2020.01); *A24F 40/90* (2020.01); *H02J 50/001* (2020.01); *H02J 50/10* (2016.02); *A24F 40/20* (2020.01)

(58) Field of Classification Search
CPC ........................................................ A24F 47/00
USPC .................................................. 131/328–329
See application file for complete search history.

(56) References Cited

U.S. PATENT DOCUMENTS

6,280,392 B1 *  8/2001  Yoshimi ............... A61B 5/7415
                                                              600/534
2017/0347718 A1   12/2017  Nakano et al.

FOREIGN PATENT DOCUMENTS

| EP | 2110034 A1 | 10/2009 |
|---|---|---|
| JP | 2017513465 A | 6/2017 |
| WO | 2015137815 A1 | 9/2015 |
| WO | 2015138560 A1 | 9/2015 |
| WO | 2016139813 A1 | 9/2016 |
| WO | 2017055803 A1 | 4/2017 |

(Continued)

OTHER PUBLICATIONS

International Search Report including the Written Opinion from Application No. PCT/EP2018/073617 dated Nov. 30, 2018, 15 pages.

*Primary Examiner* — Phuong K Dinh
(74) *Attorney, Agent, or Firm* — Lerner, David, Littenberg, Krumholz & Mentlik, LLP (57) ABSTRACT

An induction heating assembly for a vapour generating device includes an induction coil and a memory storage device. The induction coil is arranged to heat, in use, a susceptor and the induction coil is also arranged to transmit and receive, in use, an electromagnetic field to transfer data to and from an external information device.

17 Claims, 7 Drawing Sheets

(56) References Cited

FOREIGN PATENT DOCUMENTS

| | | |
|---|---|---|
| WO | 2017109448 A2 | 6/2017 |
| WO | 2017118553 A1 | 7/2017 |

\* cited by examiner

INDUCTION HEATING ASSEMBLY FOR A VAPOUR GENERATING DEVICE

CROSS-REFERENCE TO RELATED APPLICATIONS

The present application is a national phase entry under 35 U.S.C. § 371 of International Application No. PCT/EP2018/073617, filed Sep. 3, 2018, published in English, which claims priority to European Application No. 17189678.0 filed Sep. 6, 2017, the disclosures of which are incorporated herein by reference.

BACKGROUND OF THE INVENTION

The present invention relates to an induction heating assembly for a vapour generating device. Devices which heat, rather than burn, a substance to produce a vapour for inhalation have become popular with consumers in recent years.

Such devices can use one of a number of different approaches to provide heat to the substance. One such approach is a vapour generating device which employs an inductive heating system. In such a device an induction coil (hereinafter also referred to as an inductor) is provided with the device and a susceptor is provided with the vapour generation substance. Electrical energy is provided to the inductor when a user activates the device which in turn creates an electromagnetic field. The susceptor couples with the field and generates heat which is transferred to the substance and vapour is created as the substance is heated.

Such an approach has the potential to provide better control of heating and therefore vapour generation. However, in practice such an approach can result in a relatively bulky device with a large number of components. This can make it expensive to produce and inconvenient to users who expect a simple and compact device.

Furthermore, there is a growing demand for users to be able to track their use of these devices in order to monitor and assess their usage trends. As these devices become more capable and installed with an increasing number of functionalities, there is also an increasing need to periodically update the internal software to provide fixes and improvements to the device operation. It is also desirable to extract certain data relating to the device so that the condition and status of the device can be monitored.

However, the exchange of such information with the device requires means for data connection, typically plugging into the device an external information device through a connection cable, which can often become worn over time with use, as well as the socket to which the connection cable is connected becoming worn or impaired due to ingress of external objects such as dirt and dust making it more difficult to seal the device. This also adds to the component count of the device. In addition, the need to plug in the device for connection can be slow and bothersome for the user. There is therefore a demand for a vapour generating device capable of easy and reliable data transfer, while being low-cost and suitable for handheld use.

The present invention seeks to mitigate at least some of the above problems.

SUMMARY OF INVENTION

According to a first aspect of the present invention, there is provided an induction heating assembly for a vapour generating device, the heating assembly comprising: an induction coil; and a memory storage device; wherein the induction coil is arranged to heat, in use, a susceptor and the induction coil is also arranged to transmit and receive, in use, an electromagnetic field to transfer data to and/or from an external information device.

The use of an electromagnetic field allows for wireless information exchange between the induction heating assembly and an external device. This eliminates the necessity for a physical connection and provides a quick and reliable channel for data transfer. Furthermore, by using the induction heating coil as the transmitter and receiver of the electromagnetic field for data transfer, it is possible to reliably provide inductive heating and information exchange from the same member in a vapour generating device. This leads to a reduced component count improving size, weight, production cost and safety of the device.

According to a second aspect of the present invention, there is provided an induction heating assembly for a vapour generating device, the heating assembly comprising: an induction coil; and a memory storage device; wherein the induction coil is arranged to heat, in use, a susceptor and the induction coil is also operable to cooperate, in use, with an external information device, via an indirect electromagnetic inductive coupling, to transfer data from the memory storage device to the external information device, and/or to receive data from the external information device.

Preferably, the induction coil is operable to cooperate, in use, with an external information device, via an indirect electromagnetic inductive coupling to transfer and/or receive data to and/or from the external device using a plurality of different transmission methods, whereby the heating assembly and/or the external device is or are operable to select which of the plurality of different transmission methods to employ based on whether or not the induction coil is being used to perform another function simultaneously with the transfer of data, and, most preferably, if so to select one of the plurality of different transmission methods to employ based on what that simultaneously performed function is.

The different transmission methods may include modulating a carrier signal in which different methods modulate carrier signals of different frequencies. For example a first transmission method may modulate a carrier signal having a frequency selected to provide a desired level of heating of the susceptor (when the carrier signal is applied to the induction coil) whilst a second method may modulate a carrier signal having a frequency selected to provide efficient energisation of the induction coil by an external device (when the carrier signal is applied to a coil contained by the external device), etc. Additionally, the different transmission methods may include using a load shift keying technique, etc.

Preferably, the heating assembly is additionally operable to harvest electrical power from the external information device via an indirect electromagnetic inductive coupling. In such a case, it is convenient if the heating assembly is operable to transfer data from the memory storage device to the external information device using a load shift keying technique whilst harvesting power from the external information device. In this way no additional power is required to be used by a local power source associated with the heating assembly and the current induced in the coil can be primarily used to charge such a local power source at the same time as transmitting data from the heating assembly to the external (charging) device.

Alternatively, or in addition, the heating assembly may be operable to transfer data from the memory storage device to the external information device by modulating a heating alternating current applied to the induction coil, the heating alternating current having a frequency selected to substantially optimise the transfer of power from electrical power applied to the induction coil into heat generated by the susceptor. Such a case is particularly useful where the external device is not intended to charge a local power source associated with the heating assembly, but where it is desired to simultaneously heat the susceptor (e.g. for aerosol generation) and transmit data to the external device.

Yet further alternatively or in addition, the heating assembly may be operable to transfer data from the memory storage device to the external information device by modulating a data transmission alternating carrier current applied to the induction coil, the carrier current having a frequency selected to substantially optimise the transfer of power from the induction coil to the external information device. This approach is particularly convenient where the heating assembly is required simply to transmit data to the external device (i.e. without simultaneously being required to either receive charge from the external device or to heat the susceptor). An advantage of this approach is that only a relatively small amount of energy is required to be used to transmit the data because of the efficiency of the transfer of power over the electromagnetic inductive coupling at the selected frequency. Any known technique for selecting a suitable frequency can be employed, such as, simply scanning through a range of frequencies and cooperatively selecting a frequency within that range which seems to be optimal (for the primary purpose—e.g. for harvesting energy for charging a local power source, for example).

Yet further alternatively or in addition, the induction heating system assembly may be operable to receive data from the external information device to the memory storage device by demodulating a charging alternating current induced in the induction coil, the charging alternating current having a frequency selected to substantially optimise the transfer of power from external information device to the induction coil. This approach is particularly convenient where the external device is intended to charge a local power source associated with the heating assembly, and simultaneously the heating assembly is required to receive data from the external device.

Preferably, the heating assembly further includes a modulator for modulating a carrier signal with a data transmission signal for transmission from the heating assembly to the external information device. Preferably, the carrier signal has a frequency at or close to a resonant frequency of the combination of the heating assembly and the external information device.

Alternatively, or additionally, the heating assembly may include a demodulator for recovering a data signal modulated by the external information device onto a carrier signal received by the induction coil of the heating assembly, the carrier signal again most preferably being at or close to a resonant frequency of the combination of the heating assembly and the external information device. Most preferably, the heater assembly comprises a modem capable of performing both the above-mentioned modulation function and the above-mentioned demodulation function.

In certain embodiments, the modulation may be a simple amplitude modulation. However, as will be apparent to persons skilled in the art, more complex modulation schemes may be employed if greater data transmission bandwidth, or greater energy transmission efficiency, is required etc. For example, in some embodiments it is possible to use Frequency Shift keying modulation for data transfer from external information device to heater assembly and load-shift keying for data transfer in the opposite direction.

Note that in general all of the options described above in respect of transmitting data from the heating assembly to an external device can be used (in at least some embodiments) in the reverse direction to receive data at the heating assembly from an external device. Thus, if data is to be received, for example, from a low power external device (e.g. a watch) it may be convenient for the external device to use load shift keying of a driver current generated by the heating assembly (or the device in which the heating assembly is installed) which driver current preferably has a frequency selected to substantially optimise the efficiency of power transfer from the induction coil of the heater assembly to the external device.

On the other hand, if the external device is connected to an abundant power source (e.g. having a connection to mains electricity) it may be desirable for the external device to include an induction coil which can directly heat the susceptor. In such a case, data can be received by the heater assembly by demodulating a current induced (possibly somewhat inefficiently) in the induction coil of the heating assembly in order to recover a data signal modulated onto the heating current by the external device. Note that in such a case, the frequency of the (carrier) heating current is chosen to substantially optimise the heating of the susceptor rather than to optimise the power transfer from the external device to the induction coil of the heating assembly.

As a contrast, where the data is to be transmitted from the external device to the heating assembly whilst simultaneously providing power via the inductive electromagnetic link between the external device and the heating assembly (e.g. in order to charge a local power source associated with the heating assembly such as a rechargeable battery) it may be convenient to modulate a data signal encoding the data to be transmitted onto a carrier current having a frequency chosen to optimise the efficiency of power transfer from the external device to the induction coil of the heating assembly.

The susceptor may comprise one or more of, but not limited to, aluminium, iron, nickel, stainless steel and alloys thereof (e.g. Nickel Chromium). With the application of an electromagnetic field in its vicinity, the susceptor may generate heat due to eddy currents and magnetic hysteresis losses resulting in a conversion of energy from electromagnetic to heat.

Preferably, the induction heating assembly may further comprise an induction controller arranged to be in electrical connection with the induction coil and memory storage device such that, in use, the induction coil can be used to heat an external susceptor or to selectively exchange data at the induction coil in the form of an electromagnetic field.

The induction controller provides an ability to selectively control the induction heating assembly to provide inductive heating or facilitate data transfer with an external device. This allows the user to control the extent of both the heating and the data transfer functionalities through the induction coil, and to supply electrical current only when it is needed. The use of a single control unit to control the two functionalities through the induction coil further reduces the component count and also improves the safety of the heating assembly.

Whilst the induction heating assembly may operate to continuously transmit and receive data, constantly maintaining an electromagnetic field can consume large amounts of power. There may also be situations in which the electromagnetic field will not contain any useful signal (i.e. cases in which there is no useful data to be communicated between the heating assembly and the external information device). Preferably, the heating assembly may further comprise a data detector configured to detect data when an electromagnetic field from an external device is received at the induction coil.

By using a data detector to identify when useful data is received, it is possible to reduce unnecessary standby power when no data is being transmitted to the induction coil. This is also useful for addressing issues caused by nonsense signals containing no useful information.

Whilst the heating assembly may take any shape and form, the heating assembly may be arranged to take substantially the form of the induction coil, to reduce excess material use. Preferably, the induction coil may be substantially cylindrical in shape.

The circular cross-section of a cylindrical induction coil is ideal for inserting a body to be inductively heated and heating the body uniformly, and leads to a shape of a heating assembly which is comfortable for the user to hold.

When Operating to Wirelessly Transfer Data with an External Device, the Induction Coil is Capable of Coupling with External Devices of any Shape and Form.

Typically, the external device may comprise an external induction coil for receiving and transmitting an electromagnetic field. Preferably, the induction heating assembly may be arranged to transfer and receive data from an external source which is substantially cylindrical in shape.

The heating assembly may be operated to transfer data with an external source by placing the external source in proximity to the induction coil, so as to couple the two through an electromagnetic field. Whilst the external source may interact with the induction coil in any fashion, typically the heating assembly is arranged to receive, in use, at least a portion of an external source of electromagnetic field within its volume.

By placing a portion of the external source inside the heating assembly, it is possible to ensure a safe and compact wireless connection between the external source and the induction coil of the heating assembly. This arrangement helps to maintain a strong electromagnetic coupling between the induction coil and the external source, to increase efficiency and accuracy of data transfer. Furthermore, in this arrangement the heating assembly acts as a shield against other electromagnetic fields while transferring data.

Alternatively, at least a portion of the assembly may be arranged to be, in use, inserted in the volume of an external source of an electromagnetic field. The external source may have an opening and a portion of its internal volume within which the assembly may be inserted. Alternatively, the external source may have a through hole therein such that its internal perimeter allows the assembly to be inserted therethrough. By having a portion of the assembly which is insertable in an interior volume of an external source, is it possible for the mouthpiece to be exposed while operating in connection with a compact external source.

When coupling the assembly to an external device, either internally or externally, there may be situations in which a stable physical connection is required. The device may be provided with means for fixing the position of the external source in relation to the induction heating assembly. Preferably, there may be means for fixing the position of the external coil in relation to the induction coil of the assembly, such as a snap-fit mechanism. This may allow the two devices to be physically coupled such that the electromagnetic coupling may also be maintained.

There may be situations in which it is advantageous to provide a coupling to an electromagnetic field for data transfer from outside the volume of the induction heating assembly. For example, it may be desirable to operate at the same time both the heating and data transfer functionalities of the induction heating assembly, in which case an external source which wraps around the induction heating assembly is advantageous. By having the heating assembly arranged to be inserted in an external device, it is possible to free up the internal space of the assembly to be occupied by a substance to be heated. The internal space may be defined radially inward of the induction coil and may be arranged to receive a body comprising a vaporisable substance and an induction heatable susceptor.

Although the induction heating assembly may be connected to an external power source, preferably the assembly may comprise a rechargeable power source arranged in use to provide power to the induction coil and the memory storage device.

Whilst the rechargeable power source may be charged by any means, preferably the power source may be in connection with the induction controller such that in use, an electrical current can be selectively supplied to the power source when power is received at the induction coil in the form of an electromagnetic field generated by an external device, to inductively charge the power source. The recharge may conveniently take place while data is being transferred between the assembly and the external device.

We have found that, during data transfer with an external device, some, or all of the electrical power received at the induction coil can be directed to the rechargeable power source to inductively charge the power source. This configuration provides the possibility of a wireless charging system whilst minimising the required component count.

The power received at the induction coil may be portioned between current for the purposes of data transfer and for power source charging (e.g. by employing Frequency or Time Division Multiple Access (FDMA or TDMA) techniques). Alternatively, the same current used for charging the rechargeable power source may be used as a carrier for data. This allows the current to perform multiple roles thereby increasing efficiency and rate of charge of the rechargeable power source. This also provides an efficient mechanism for charging the vapour generating device while at the same time exchanging information.

The data transfer capability of the induction heating assembly may be utilised to transfer any type of information, particularly information related to the properties of the vapour generating device. The data transferred using the induction coil may conveniently include one or more of device usage history, remainder of power source charge, software updates for the vapour generating device, estimated remainder of vaporisable substance, voltage level of the rechargeable power source where the rechargeable power source is a rechargeable battery, etc.

By transferring information related to the vapour generating device, the user is able to keep track of certain aspects which may be beneficial for the user. For example, the device usage history will allow the user to keep track of how frequently the device is being used, which may lead to certain usability benefits for the user. In addition, the usage data along with the ability to install software updates leads to improved performance and increased operational lifetime of the vapour generating device. The ability to check the remainder of power source charge is also an advantage as this allows the user to identify when the device requires charging. Additionally, the transfer of information about the state of the power source allows the external charging device to tailor the amount of energy which it emits during charging to optimise the energy efficiency of the charging process (i.e. reducing the power expended in charging when the power source is almost fully charged and ceasing it completely when the power source is fully charged, etc.).

The assembly may be arranged to operate in use with a fluctuating electromagnetic field having a magnetic flux density of between approximately 0.5 Tesla (T) and approximately 2.0 T at the point of highest concentration.

The power source and circuitry may be configured to operate at a high frequency. Typically, the power source and circuitry may be configured to operate at a frequency of between approximately 80 kHz and approximately 500 kHz, preferably between approximately 150 kHz and approximately 250 kHz, more preferably 200 kHz.

Whilst the induction coil may comprise any suitable material, typically the induction coil comprises a Litz wire or a Litz cable.

According to another aspect of the present invention, there is provided a vapour generating device comprising an induction heating assembly according to the first aspect of the present invention; a heating compartment arranged to receive a body comprising a vaporisable substance and an induction heatable susceptor; an air inlet arranged to provide air to the heating compartment; and an air outlet in communication with the heating compartment.

By using a heating assembly which is optimised for multiple functions of heating and transferring data, it is possible to provide a compact, lightweight and convenient vapour generating device with wireless data transfer and charging capabilities.

The body may be a capsule which includes in use a vaporisable substance inside an air permeable shell. The air permeable material may be a material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter.

Alternatively, the body may be a vaporisable substance wrapped in paper. Alternatively, the body may be a vaporisable substance held inside a material that is not air permeable, but which comprises appropriate perforation or openings to allow air flow. Alternatively, the body may be the vaporisable substance itself. The body may be formed substantially in the shape of a stick.

The vaporisable substance may be any type of solid or semi-solid material. Example types of vapour generating solids include powder, granules, pellets, shreds, strands, porous material or sheets. The substance may comprise plant derived material and in particular, the substance may comprise tobacco.

Preferably, the vaporisable substance may comprise an aerosol-former. Examples of aerosol-formers include polyhyrdric alcohols and mixtures thereof such as glycerine or propylene glycol. Typically, the vaporisable substance may comprise an aerosol-former content of between approximately 5% and approximately 50% on a dry weight basis. Preferably, the vaporisable substance may comprise an aerosol-former content of approximately 15% on a dry weight basis.

The vaporisable substance may be the aerosol-former itself. In this case, the vaporisable substance may be liquid. In this case, the body may have a liquid retaining substance (e.g. a bundle of fibres, porous material such as ceramic, etc.) which retains the liquid to be vaporised by a vaporiser such as a heater, and allows a vapour to be formed and released or emitted from the liquid retaining substance towards the air outlet for inhalation by a user.

Upon heating, the vaporisable substance may release volatile compounds. The volatile compounds may include nicotine or flavour compounds such as tobacco flavouring.

Since the induction coil produces a field when operating to heat a susceptor, any member comprising an induction heatable susceptor will be heated when placed in proximity to the device in operation, and as such there is no restriction on the shape and form of the body being received by the heating compartment.

Preferably, the body to be heated is cylindrical in shape and as such the heating compartment may be arranged to receive a substantially cylindrical vaporisable article.

The ability of the heating compartment to receive a substantially cylindrical member to be heated is advantageous as, often, vaporisable substances and tobacco products in particular are packaged and sold in a cylindrical form.

According to another aspect of the present invention, there is provided a method of exchanging information with a vapour generating device, the method comprising the steps of: placing an external information device in proximity to an induction heating assembly of the vapour generating device, the induction heating assembly comprising an induction heating coil and a memory storage device; and transferring data in the form of an electromagnetic field between the induction heating coil of the heating assembly and the external information device.

By using the induction heating coil of the vapour generating device to transmit and receive an electromagnetic field, it is possible to provide wireless information transfer between the vapour generating device and an external device without the need for a separate second induction or otherwise arrangement for data emission.

Although the external information device may be arranged to interact with the induction coil in any fashion, preferably, a portion of the external information device may be at least partially inserted in a volume of the induction heating assembly. This ensures that a proper connection is maintained between the external information device and the induction heating coil to provide a safe and reliable coupling to transfer data between the two devices. This also means that the heating assembly acts as a shield against other unwanted electromagnetic fields while transferring data.

Alternatively, a Portion of the Induction Heating Assembly May be at Least Partially Inserted in a Volume of the External Information Device.

By having the external information device placed external to the vapour generating device, it is possible to free up space in the internal volume of the device for a vaporisable substance to be received, such that the device may be operated simultaneously to utilise the heating and data transfer functionalities.

BRIEF DESCRIPTION OF THE DRAWINGS

The invention will now be described by way of example with reference to the accompanying drawings, in which.

DETAILED DESCRIPTION

The present invention provides a vapour generating device which employs an inductive heating system and which is capable of wireless information transfer with an external device. These functionalities are enabled by an induction heating assembly installed in the device.

Figure 1:
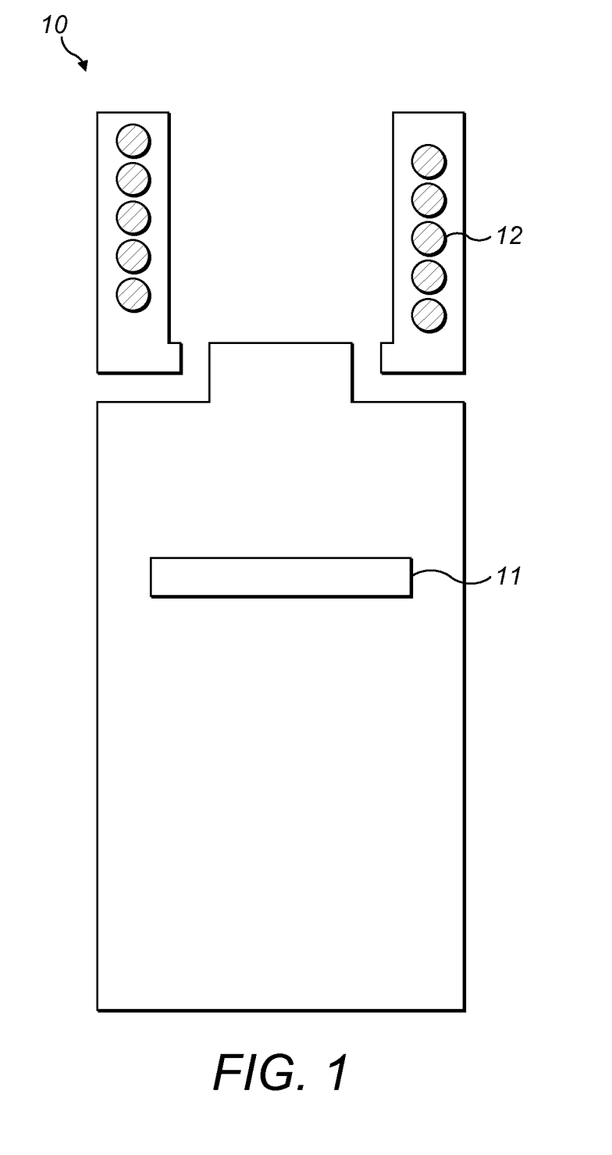
FIG. 1 schematically illustrates an induction heating assembly according to an example of the present invention.

FIG. 1 schematically illustrates a cross-sectional view of an induction heating assembly 10 according to an example of the present invention. The heating assembly 10 includes an induction coil 12 and a memory storage device 11. The induction coil 12 and the memory storage 11 are placed in electrical connection such that a signal can be transmitted through a carrier current between the two components. In this example, the induction coil 12 is substantially cylindrical, such that the form of the induction heating assembly 10 is also substantially cylindrical.

When operating to receive data from an external source, an external electromagnetic field received at the induction coil 12 induces a current (an alternating current) in the coil. This current is processed using conventional signal processing means including a demodulation by a modem (not shown) to recover the transmitted data from the received current and then the recovered data is passed to the memory 11 where it is stored (possibly after some post-reception processing—e.g. to aggregate the received data with existing pre-stored data already stored in the memory 11).

To transmit information, the memory storage device 11 of the heating assembly 10 sends data to be transmitted to the modem (not shown) which generates signals in the form of a suitably modulated carrier current to the induction coil 12, where an electromagnetic field is produced in the vicinity of the coil 12. The electromagnetic field can then be received by an external device and processed to extract the data, thereby wirelessly transmitting information from the induction heating assembly 10 to the external device. Alternatively, the modem may operate by modulating the load applied to the induction coil in a manner which can be detected by the external device in accordance with the well-known load-shift keying modulation scheme. In this way, no power is expended by the rechargeable power source within the device in order to transmit data to the external device in energising the induction coil, and instead the power source can continue to be charged by the external device while simultaneously transmitting data to the external device.

The electromagnetic field emitted from the induction coil 12 can also be received by an induction heatable susceptor. The susceptor, when placed in the vicinity of the induction coil 12, receives the electromagnetic field of the coil 12 which induces eddy currents in the susceptor thereby generating heat. Preferably, the external susceptor is manufactured from a material with high resistivity in order to increase the heating effect of the inductive heating.

In this way, the induction heating assembly 10 is able to provide both wireless information transfer and inductive heating from the same member.

In such a case, it is preferable if the induction coil is energised (by the rechargeable power source 15 discussed below) at a frequency which is optimal for inducing heating in the susceptor(s) and which may be less than optimal for transmitting power between the heating assembly and the external device. In order to receive data from the external device whilst simultaneously heating the susceptor(s), it may be convenient to transmit the data using a carrier signal having a frequency different to the frequency employed by the induction coil to heat the susceptor(s) or at different times (i.e. employing an FDMA or TDMA duplex approach to minimise interference).

Figure 2:
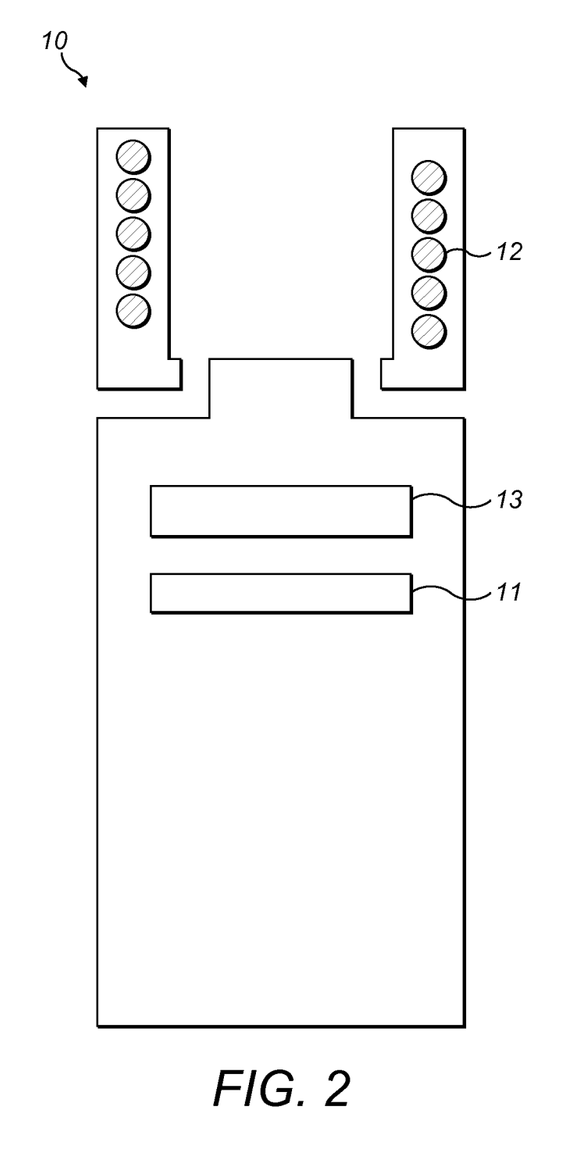
FIG. 2 schematically illustrates an induction heating assembly according to another example of the present invention.

In the example shown in FIG. 2, the induction heating assembly further comprises an induction controller 13. The induction controller 13 is arranged to be in electrical connection with the memory storage device 11 and the induction coil 12 so as to control the electrical current flowing between the two components. The induction controller 13 is capable of being manually operated by the user, to select a heat setting and control the variety and extent of data transfer. As an alternative, the induction controller 13 can be programmed to automatically adjust the current between the coil 12 and the memory 11 (and associated data transmission and reception components such as a modem) according to predetermined parameters.

There may be situations in which the current within the induction heating assembly needs to be changed between a direct current and an alternating current (e.g. to convert between a direct current for use in charging the power source 15 or supplied from the power source 15 to be applied to the induction coil for heating the susceptor(s), etc.). To account for this, an inverter and rectifier pair may also be installed in the heating assembly.

Figure 3:
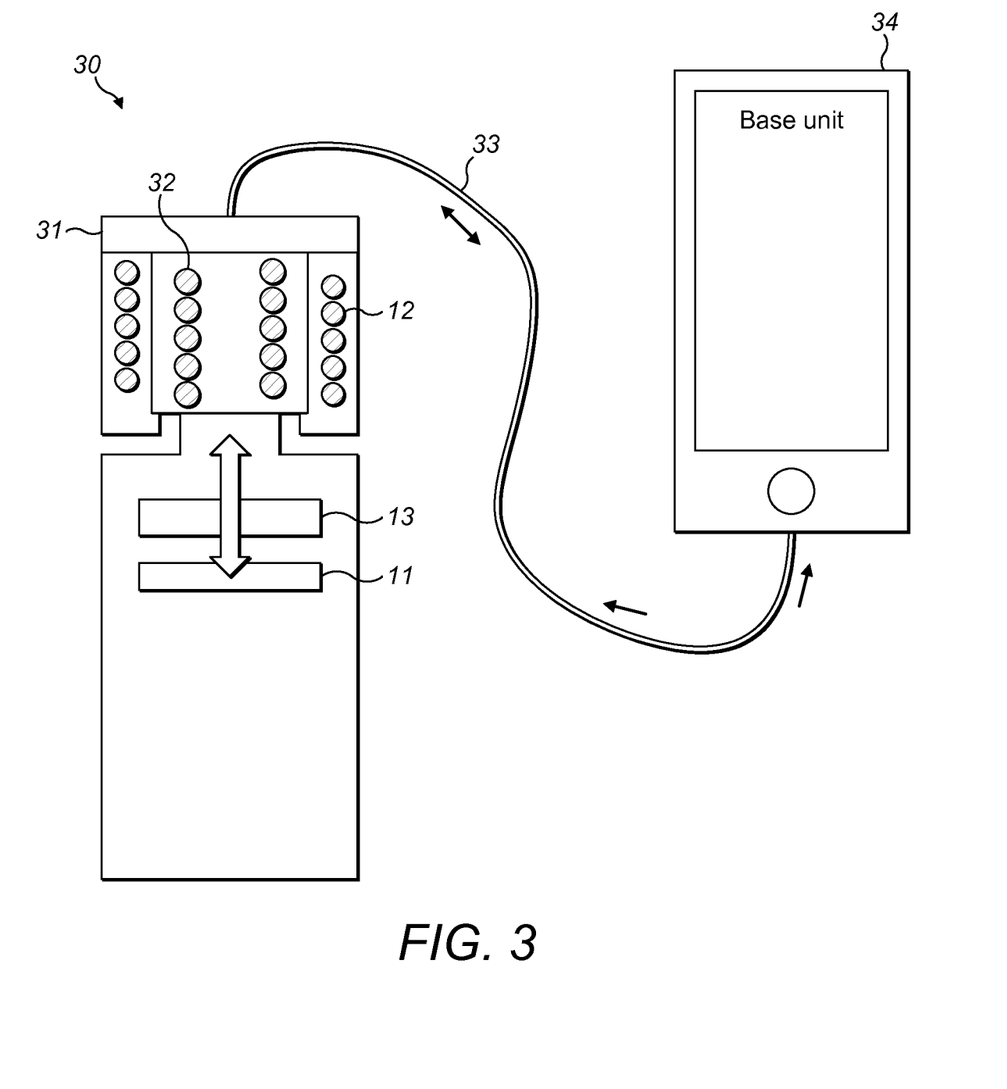
FIG. 3 schematically illustrates an example of how the induction heating assembly of FIG. 2 interacts with an external device.

FIG. 3 schematically illustrates an example of how the induction heating assembly 10 of FIG. 2 interacts with an external induction device 30. The external induction device 30 comprises an external coil 32 and a connection 33 to an external base unit 34. In this example, the induction heating assembly 10 receives within its volume a portion 31 of the external induction device 30. In particular, the external induction device 30 is inserted in the induction heating assembly 10 such that the perimeter of the external coil 32 is substantially surrounded by the induction coil 12 of the heating assembly 10 and the central axes of the two coils overlap. This arrangement provides an improved electromagnetic coupling between the heating assembly 10 and the external device 30 for more secure and efficient data transfer. The heating assembly 10 also acts as a shield against other unwanted electromagnetic fields while transferring data.

The external induction device 30 is connected through a connection cable 33 to an external base unit 34. When operating to send information from the induction heating assembly 10 to the external base unit 34, a signal, controlled by the induction controller 13, is transmitted from the memory device 11 to the induction coil 12 in the heating assembly 10, as indicated by the arrow passing through the controller in FIG. 3. The current through the induction coil 12 causes an electromagnetic field to be generated in the vicinity of the coil 12, which is received at the external coil 32 of the external induction device 30. The field at the external coil 32 induces a current which acts as a carrier current for the signal, which is then passed through the connection cable 33, as indicated by the arrows adjacent cable 33 in FIG. 3, to the external base unit 34 where the signal is processed and stored.

In this way, information is transferred from the induction heating assembly 10 to the external device 30 without the need for a physical connection. In other words, wireless data transfer is achieved.

The induction heating assembly 10 is also capable of receiving information from an external source. In this example, a signal is sent from the external base unit 34 to the external coil 32, as indicated by the arrows adjacent cable 33 in FIG. 3, where an electromagnetic field is generated in the vicinity of the external coil 32. This field induces a carrier current at the induction coil 12 in the heating assembly 10, which is selectively passed to the memory device 11.

A user can simply insert the external induction device 30 in the heating assembly 10 to set up the transfer of data. The internal perimeter of the heating assembly 10 may be provided with stoppers to hold the portion 31 of the external device 30 in place once inserted. Once coupled, the data transfer may begin either at the user's command, or automatically, preferably with the use of an internal data detector.

Figure 4:
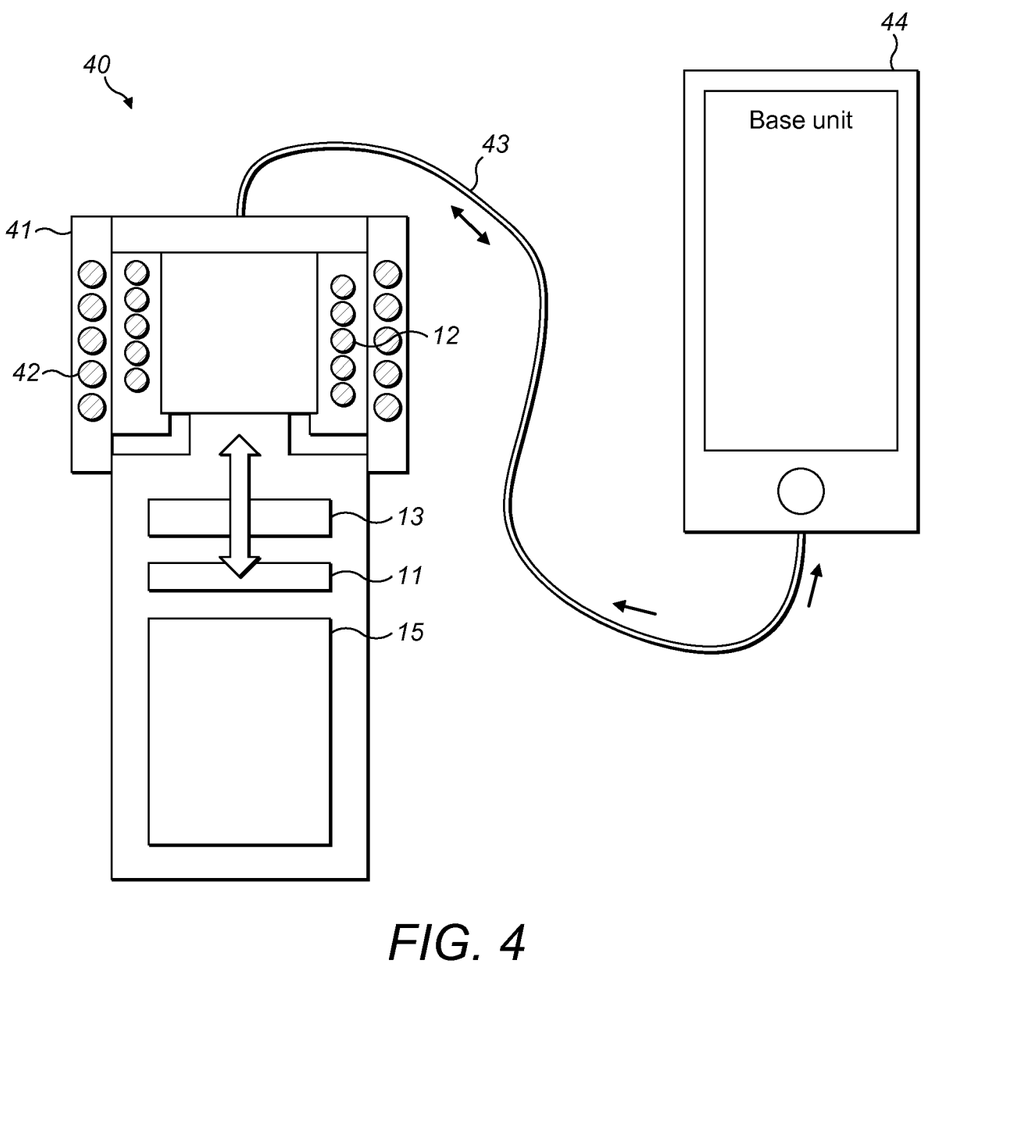
FIG. 4 schematically illustrates another example of how the induction heating assembly interacts with an external device.

Another example of how the induction heating assembly 10 according to the present invention may interact with an external induction device 40 is illustrated in FIG. 4. As above, the external induction device 40 comprises an external coil 42 and a connection 43 to an external base unit 44. In this example, a portion 41 of the external induction device 40 is substantially cup-shaped and a portion of the heating assembly 10 is inserted in a volume of the external induction device 40. Specifically, the heating assembly 10 is inserted in the external device 40 such that the perimeter of the induction heating coil 12 is substantially surrounded by the perimeter of the external coil 42 of the external induction device 40 and the central axes of the two coils substantially overlap. As before, this substantial overlap of the two coils ensures a strong electromagnetic coupling between the heating assembly and the external device for a secure connection and efficient data transfer. Notably, in this configuration the internal volume of the induction heating assembly 10 is not used, and an exemplary use of this space is later described with reference to FIG. 7.

As described above, data can be exchanged between the induction heating assembly 10 and the external base unit 44, as indicated by the arrow passing through the controller 13 and arrows adjacent cable 43 in FIG. 4, through an electromagnetic field coupling the two induction coils together.

In this example, the induction heating assembly 10 further comprises a rechargeable power source 15. The power source 15 is in connection with the induction controller 13 and is arranged to provide power to the induction coil 12 and the memory storage device 11. When power is received at the induction coil 12, an electrical current can be selectively supplied to the power source 15 to inductively charge the power source 15. In this way, the power source 15 can be inductively charged while data is being transferred between the assembly 10 and the external device 40. Although the charging and the data transfer may occur separately, the current used for charging the power source 15 can be used as the carrier for the transferred data.

Figure 5:
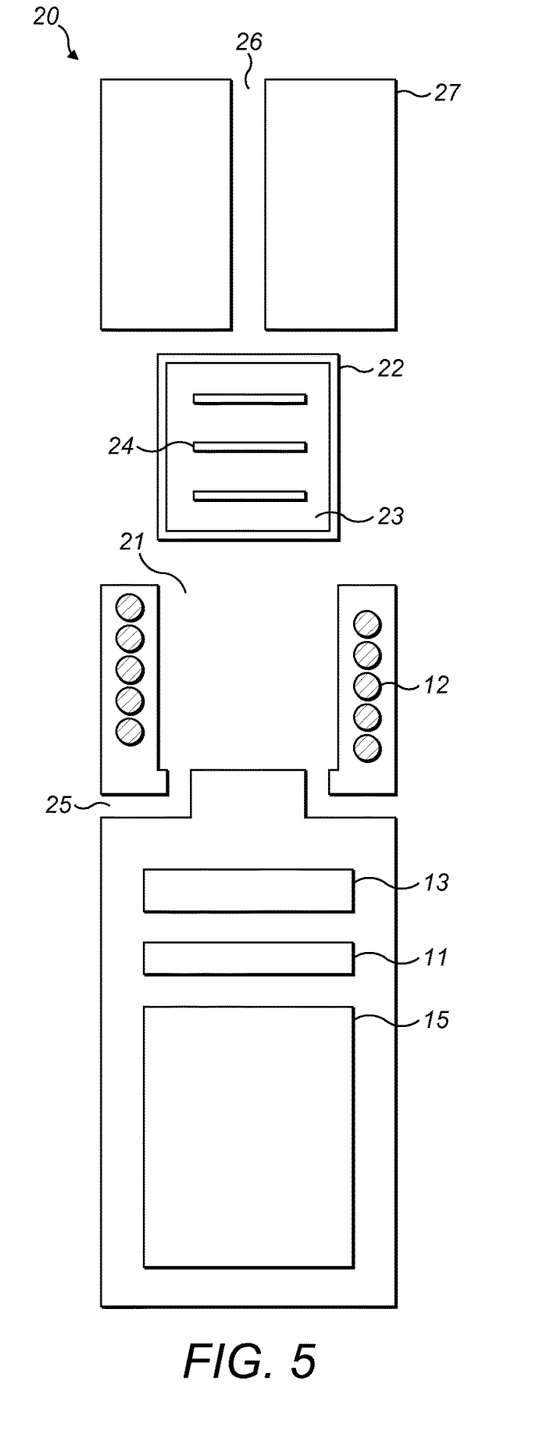
FIG. 5 schematically illustrates an exploded view of a vapour generating device according to an example of the present invention.

FIG. 5 schematically illustrates an exploded view of a vapour generating device 20 according to an example of the present invention. In this example, the vapour generating device 20 comprises an induction heating assembly 10 and further comprises a heating compartment 21 arranged to receive a body 22 comprising a vaporisable substance 23 and an induction heatable susceptor 24. The heating compartment 21 is at least partially adjacent to or contained in the volume of the induction coil 12. An air inlet 25 positioned adjacent to the heating compartment 21 provides air from the surrounding environment to the heating compartment 21. An air outlet 26 is in communication with the heating compartment 21 and provides means for extracting vapour produced within the heating compartment 21. All, or some of the components shown in FIG. 5 are arranged to be removable, and FIG. 6 illustrates how the various components of the vapour generating device 20 shown in FIG. 5 assemble together in use.

In this example, the device is installed with a mouthpiece 27 in communication with the air outlet 26. The mouthpiece 27 provides the ability for a user to easily draw the vapour generated from the device 20.

The heating compartment 21 is arranged to receive a body 22 comprising a vaporisable substance 23 and an induction heatable susceptor 24. Preferably, the body 22 has a layer or membrane to contain the vaporisable substance, with the layer or membrane being air permeable. For example, the body 22 may be a disposable capsule containing tobacco and at least one induction heatable susceptor element. The susceptor 24 may be in direct or indirect contact with the vaporisable substance 23, such that when the susceptor 24 is inductively heated by the induction coil 12 of the induction heating assembly 10, heat is transferred from the susceptor 24 to the vaporisable substance 23 to produce a vapour. The vaporisation of the vaporisable substance 23 is facilitated by the addition of air from the surrounding environment through the air inlet 25. The vapour generated by heating the vaporisable substance 23 then exits the heating compartment 21 through the air outlet 26 and may be inhaled by a user of the device. The flow of air through the heating compartment 21, i.e. from the air inlet 25 through the compartment 21 and out of the air outlet 26, may be aided by negative pressure created by a user drawing air from the outlet 26 side of the device 20.

Figure 6:
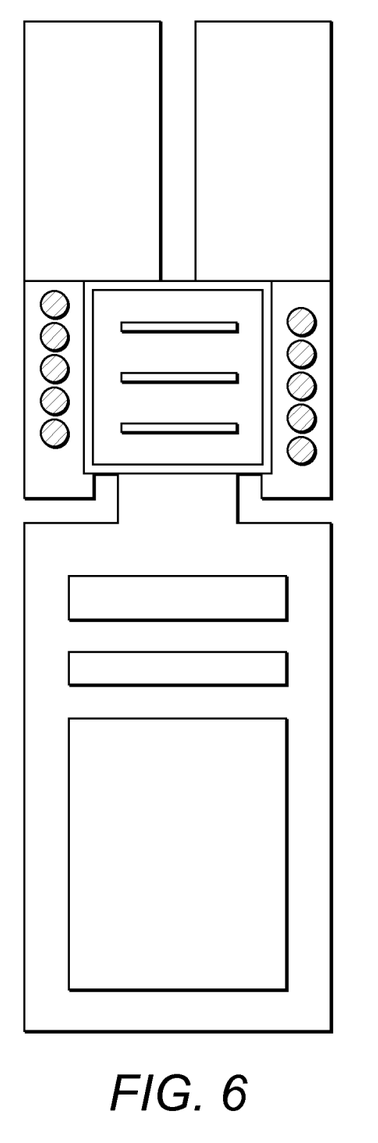
FIG. 6 schematically illustrates the vapour generating device of FIG. 5, in use.
Figure 7:
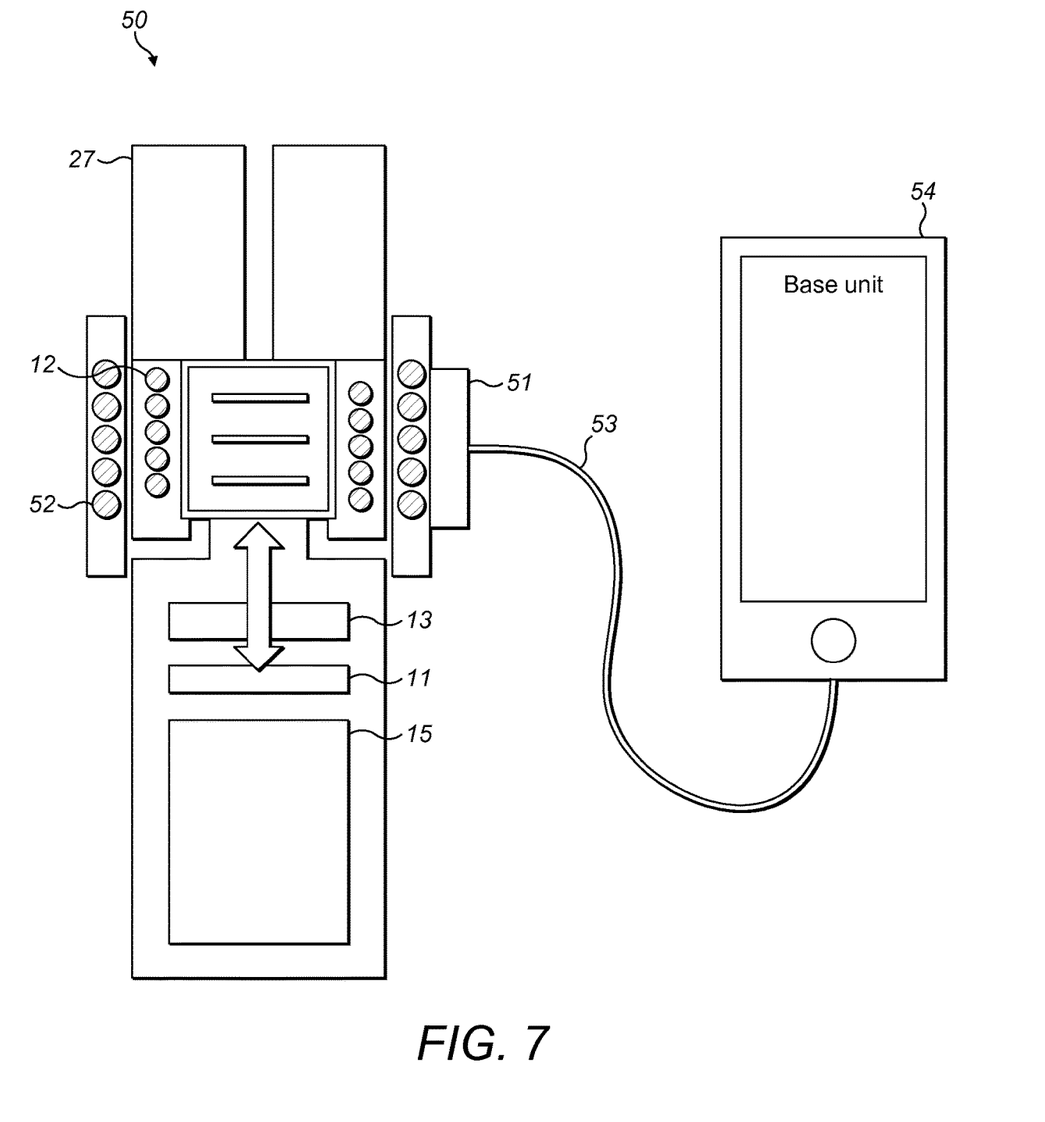
FIG. 7 schematically illustrates an example of how the vapour generating device of FIGS. 5 and 6 interacts with an external device.

FIG. 7 schematically illustrates how the vapour generating device 20 of FIGS. 5 and 6 may be operated to transfer data, and to inductively heat a vaporisable substance 23. An external induction device 50 comprising an external coil 52 surrounds the perimeter of the induction heating assembly 10 such that the central axes of the heating coil 12 and the external coil 52 are substantially overlapping. In this example, the external induction device 50 has two open ends, through which the induction heating assembly 10 may be inserted. There may be means for fixing the position of the external coil 52 in relation to the induction coil 12, such as snap-fit mechanism. This allows the vapour generating device 20 to be operated to heat a susceptor 24, and to exchange data with an external device 50 at the same time.

As will be appreciated from the above, the present invention, by providing the functionalities of induction heating and data transfer without the need for physical connection or a separate receiver/transmitter, enables the provision of a vapour generating device with wireless data handling capabilities which is inexpensive, compact and suitable for portable handheld use. An electronic vapour generating device with a safe and efficient information exchange system and a low component count to reduce size, weight and manufacture cost, is achieve by the invention and yet still enables the heating functionalities of such a vapour generating device.

The invention claimed is:

1. An induction heating assembly for a vapour generating device, the heating assembly comprising:

an induction coil; and a memory storage device; wherein the induction coil is arranged to heat, in use, a susceptor and the induction coil is also operable to cooperate, in use, with an external information device, via an indirect electromagnetic inductive coupling, to transfer data from the memory storage device to the external information device, and/or to receive data from the external information device, and wherein the induction heating assembly is arranged to receive, in use, at least a portion of an external source of electromagnetic field within a volume of the induction heating assembly, or at least a portion of the induction heating assembly is arranged to be inserted, in use, in a volume of the external source of the electromagnetic field.

2. The induction heating assembly according to claim 1, wherein the induction coil is operable to cooperate, in use, with an external information device, via an indirect electromagnetic inductive coupling to transfer and/or receive data to and/or from the external device using a plurality of different transmission methods, whereby the heating assembly and/or the external device is or are operable to select which of the plurality of different transmission methods to employ based on whether or not the induction coil is being used to perform another function simultaneously with the transfer of data.

3. The induction heating assembly according to claim 1, wherein the heating assembly is additionally operable to harvest electrical power from the external information device via an indirect electromagnetic inductive coupling.

4. The induction heating assembly according to claim 3 wherein the heating assembly is operable to transfer data from the memory storage device to the external information device using a load shift keying technique whilst harvesting power from the external information device.

5. The induction heating assembly according to claim 1, wherein the heating assembly is operable to transfer data from the memory storage device to the external information device by modulating a heating alternating current applied to the induction coil, the heating alternating current having a frequency selected to substantially optimise the transfer of power from electrical power applied to the induction coil into heat generated by the susceptor.

6. The induction heating assembly according to claim 1, wherein the heating assembly is operable to transfer data from the memory storage device to the external information device by modulating a data transmission alternating carrier current applied to the induction coil, the carrier current having a frequency selected to substantially optimise the transfer of power from the induction coil to the external information device.

7. The induction heating assembly according to claim 1, wherein the heating assembly is operable to receive data from the external information device to the memory storage device by demodulating a charging alternating current induced in the induction coil, the charging alternating current having a frequency selected to substantially optimise the transfer of power from external information device to the induction coil.

8. The induction heating assembly according to claim 1, further comprising an induction controller arranged to be in electrical connection with the induction coil and the memory storage device such that, in use, the induction coil can be used to heat an external susceptor or to selectively exchange data at the induction coil in the form of an electromagnetic field.

9. The induction heating assembly according to claim 1, further comprising a data detector configured to detect data when an oscillating electromagnetic field from an external device is received at the induction coil, whereby the heating assembly is operable to receive data transmitted to the heating assembly by the external device.

10. The induction heating assembly according to claim 1, wherein the induction coil is substantially cylindrical in shape.

11. The induction heating assembly according to claim 1, arranged to transfer and receive data from an external source which is substantially cylindrical in shape.

12. The induction heating assembly according to claim 1, further comprising a rechargeable power source arranged in use to provide power to the induction coil and the memory storage device.

13. The induction heating assembly according to claim 8, further comprising a rechargeable power source arranged in use to provide power to the induction coil and the memory storage device, wherein the power source is in connection with the induction controller such that in use, an electrical current harvested from the induction coil can be selectively supplied to the power source when power is received at the induction coil in the form of an electromagnetic field generated by an external device via an electro-magnetic inductive coupling, to inductively charge the power source.

14. The induction heating assembly according to claim 1, wherein the data transferred using the induction coil is one or more of device usage history, remainder of power source charge, or software updates for the vapour generating device.

15. A vapour generating device comprising:
the induction heating assembly according to claim 1;
a heating compartment arranged to receive a body comprising a vaporisable substance and an induction heatable susceptor;
an air inlet arranged to provide air to the heating compartment; and
an air outlet in communication with the heating compartment.

16. The vapour generating device according to claim 15, wherein the heating compartment is arranged to receive a substantially cylindrical vaporisable article.

17. A method of exchanging information with a vapour generating device, the method comprising the steps of:
placing an external information device in proximity to an induction heating assembly of the vapour generating device such that at least a portion of an external source of electromagnetic field is within a volume of the induction heating assembly, or at least a portion of the induction heating assembly is arranged to be inserted, in use, in a volume of the external source of the electromagnetic field, the induction heating assembly comprising an induction heating coil and a memory storage device; and
transferring data via an electromagnetic inductive coupling between the induction heating coil of the heating assembly and the external information device.

* * * * *